2,993,770
ROCKET FUEL ADDITIVE
Ben W. Geddes, Short Hills, N.J., assignor to Esso Research and Engineering Company, a corporation of Delaware
No Drawing. Filed July 23, 1958, Ser. No. 751,595
2 Claims. (Cl. 52—.5)

This invention relates to improved high energy fuels, and particularly rocket fuels. More specifically, the present invention relates to a rocket fuel containing an additive that reduces the normal accumulation of deposits in the gas generator turbine and in the thrust chamber coolers of liquid fuel rockets.

In a large rocket engine the fuel propellant performs a number of important functions, which in turn dictates the special properties it must have. Its primary function is to burn with liquid oxygen in a thrust chamber and expel hot gases through the nozzle. Fuel also acts as a cooling medium for the nozzle and thrust chamber, as well as for other critical metallic surfaces and components as the turbopump and combustion chamber. A portion of the fuel is burned in a gas generator with liquid oxygen under extremely fuel-rich conditions to produce hot gases to drive a turbine which in turn propels pumps feeding the main fuel and oxygen to the thrust chamber. These gases are expelled from the gas generator through a nozzle, and it is the maintenance of this nozzle free from carbonaceous deposits that the present invention applies.

In rocket missile designs employing liquid oxygen and liquid hydrocarbon fuels, a rocket fuel and liquid oxygen are separately flowed from storage tanks to separate proportioning pumps. About 99% of the fuel is pumped into the thrust chamber, and about 1% into the gas generator chamber, wherein the turbine working gas is generated under fuel-rich conditions. Thus about only 10% or so of the stoichiometric amount of oxygen necessary to convert the fuel to $H_2O$ and $CO_2$ is passed into the gas generator. Because of thermal limitations imposed by turbine blades and seals, gas temperatures must be maintained at levels below about 1600° F. The gas temperature from the gas generator depends in turn upon the liquid oxygen-to-fuel weight mixture ratio, and this is about 0.30 to 0.35 pound of oxygen per pound of fuel. The gases pass out of the gas generator through outlet nozzles; however, because of the very high ratio of fuel to oxygen, considerable carbon is formed, and this deposits in the combustor nozzle, thus materially affecting the efficiency of the missile.

Rocket missiles are extremely complicated mechanisms, and are subjected to a large variety of tests prior to acceptance. Furthermore, once a rocket is assembled prior to testing, it is highly undesirable to take it apart or to remove parts of it for cleaning and thereafter reassemble it.

Thus, in terms of energy effects, the measure of rocket combustor, or gas generator performance, is taken as the amount of decrease in energy available with time at constant combustor nozzle exhaust gas temperature and pressure. In the case of a properly operating combustor, this decrease, of course is zero over the entire test period of operation. On the other hand, with conventional rocket fuels, such as RP-1 (MIL-F-25576A), deposition of solids in the combustor nozzle has resulted in a decline of energy availability. Thus, though with gas temperatures up to 1250° F. little fouling occurs, nonetheless when this is increased up to 1600° F., thus making more fuel energy available, combustor performance was found to decrease steadily with time, the decrease becoming sharper as the gas temperature was increased.

In attempts to overcome this deposit problem and make more energy available to the missile, a large number of additives have been investigated. None has been found suitable. These include amyl, propyl and isooctyl nitrate, ferrocene and lead tetraethyl, all known as combustion promoters.

What is needed, therefore, is a fuel releasing the highest available energy at 1200° to 1600° F., yield low molecular weight exhaust gases and a minimum of solid products such as free carbon or carbonaceous polymer. Such a fuel is provided as disclosed below.

In accordance with the present invention, there is included in conventional rocket fuel from about 0.1 to 1.0% of a very high boiling stable residual product obtained by the propane deasphalting of certain selected crudes, such as Panhandle or Pennsylvania crude. This highly paraffinic material is produced, for example, by distilling a Pennsylvania crude, dissolving the residue in excess of liquid propane or other very light hydrocarbons under pressure at ordinary temperatures. Initially about 2 volumes of liquid propane for each volume of reduced crude is added, the solution thereafter cooled by evaporation, wax removed, and further propane added, up to about 6 or 8 volumes per volume of oil. On gentle heating under pressure there is precipitated a viscous resinous product of high molecular weight in the form of a heavy oil. This heavy oil may have a viscosity anywhere from about 1,000 to 10,000 SUS at 210° F. or even higher depending on the particular conditions of separation employed. This material is per se well known in the prior art and has been used previously in certain mineral oils of low viscosity, i.e. about 150 SUS at 100° F., as a metal quenching oil as described, for instance, in U.S. 1,818,431.

The resinous material is extremely high boiling with a pour point of 80° F., a flash point in the range of 675° to 690° F. and a viscosity of about 2,600 SUS at 210° F. Upon exposure to prolonged heating and oxidation in a severe 100-hour test at 300° F., the viscosity at 210° F. increases by only 19%. This low value under such severe conditions demonstrates the inherent thermal stability of the resin oil used in these tests.

The rocket fuel to which the above is added may be any of the military approved types boiling in the range of 300° to 600° F. and having a maximum available energy per pound of fuel.

The fuel is a mixture of various hydrocarbons, mostly isoparaffins, and naphthenes. The properties of this mixture are closely controlled with respect to allowable density limits, minimum flash point, maximum vapor pressure, and maximum content of aromatics, olefins, and sulfur compounds.

The following data show the good results obtained by the fuel of the present invention. These data are based on tests in a rocket gas generator in which performance is measured by determining the reduction in effective nozzle area in five-minute tests. It is standard testing procedure to run three successive five-minute tests without cleaning. The additive was blended in a conventional kerosine-type fuel meeting the U.S. Government RP-1 Specification MIL-F-25576A. It was blended in at 0.5% concentration.

*Gas generator tests*

|  | Percent reduction in effective nozzle area |
|---|---|
| Unmodified RP-1 | 11 (average of 3 runs without cleaning). |
| RP-1+0.5% additive | <1 (first run). 8 (two subsequent runs without cleaning). |

Though not bound by any theory, it is possible that the action of the additive involves the formation of a residual film along the walls of the combustion chamber and nozzle, and thus keeps these surfaces washed free of carbonaceous fuel particles. The high thermal stability of the additive probably prevents its combustion on the gas generator walls and nozzles for the period necessary to prevent the deposit build-up from the fuel.

What is claimed is:

1. A kerosine type rocket fuel consisting essentially of petroleum hydrocarbons boiling in the range of from about 300° F. to about 600° F. and containing from about 0.1 to about 1.0% by weight of a paraffinic petroleum oil residue precipitated from a paraffinic crude, said residue having a viscosity of about 1,000 to 10,000 SUS at 210° F. and a flash point in the range of about 675° F. to about 690° F.

2. A fuel as defined by claim 1 wherein said residue has a pour point of about 80° F. and a viscosity of about 2,600 SUS at 210° F.

References Cited in the file of this patent

UNITED STATES PATENTS

| | | |
|---|---|---|
| 1,818,431 | Rodman | Aug. 11, 1931 |
| 2,563,305 | Britton et al. | Aug. 7, 1951 |